United States Patent
Kurasawa et al.

[11] Patent Number: 6,040,084
[45] Date of Patent: Mar. 21, 2000

[54] CLOSED SECONDARY BATTERY CONTAINER

[75] Inventors: Yoshihiro Kurasawa; Koji Nishida, both of Hiratsuka, Japan

[73] Assignee: Mitsubishi Engineering-Plastics Corporation, Japan

[21] Appl. No.: 09/031,769

[22] Filed: Feb. 27, 1998

[30] Foreign Application Priority Data

Mar. 7, 1997 [JP] Japan .................................... 9-053021

[51] Int. Cl.[7] .............................. H01M 2/02; H01M 2/08
[52] U.S. Cl. ......................... 429/176; 429/163; 429/174; 429/185
[58] Field of Search ............................. 429/62, 176, 120, 429/206, 185

[56] References Cited

U.S. PATENT DOCUMENTS 5,686,509  11/1997  Nakayama et al. ...................... 523/201

FOREIGN PATENT DOCUMENTS

| 6-203814 | 7/1994 | Japan | .............................. H01M 2/02 |
| 8-22811 | 1/1996 | Japan . | |
| 8-250080 | 9/1996 | Japan | .............................. H01M 2/02 |

*Primary Examiner*—Maria Nuzzolillo
*Assistant Examiner*—Mark Ruthkosky
*Attorney, Agent, or Firm*—Parkhurst & Wendell, L.L.P.

[57] ABSTRACT

The present invention relates to a closed secondary battery container comprising:

at least two parts comprising a resin composition comprising (a) 100 parts by weight of a polyphenylene ether resin and (b) 1 to 30 parts by weight of a phosphoric ester compound represented by the following formula (1):

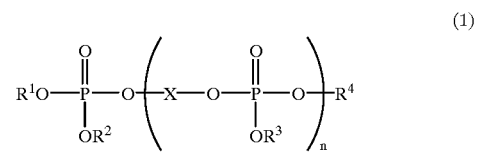

wherein $R^1$, $R^2$, $R^3$ and $R^4$ are independently a $C_1$–$C_{10}$ alkyl group, a $C_5$–$C_{15}$ cycloakyl group, a $C_6$–$C_{15}$ aryl group, a $C_1$–$C_{10}$ alkyl-substituted $C_6$–$C_{15}$ aryl group, a halogen-substituted $C_6$–$C_{15}$ aryl group, a $C_6$–$C_{15}$ aryl-substituted $C_1$–$C_{10}$ alkyl group, a halogen atom or a hydrogen atom; X is an arylene residue; and n is an integer not less than 1, and an epoxy resin adhesive comprising a base resin and a curing agent, which curing agent comprises tris(dimethylaminomethyl)phenol, a salt of organic acid of tris(dimethylaminomethyl)phenol or a mixture thereof, said parts being bonded together through said adhesive.

9 Claims, 1 Drawing Sheet

CLOSED SECONDARY BATTERY CONTAINER

BACKGROUND OF THE INVENTION

The present invention relates to a closed secondary battery container, more particularly to a closed secondary battery container comprising plural bonded parts molded from a polyphenylene ether-based resin composition.

Storage batteries or accumulators are widely used as a power source of vehicles such as automobiles, lorries and special vehicles, various types of electric apparatus, industrial equipment, etc. Also, there is a demand for the various types of secondary battery such as lead accumulator, nickel-cadmium battery and lithium battery with concomitant necessity of dimensional enlargement of battery container, diversification of design, light-weight and reduction of thickness. Request for the improvement of moldability, strength, heat resistance and other qualities of the material used for such batteries is being also intensified.

Hitherto, as resin for battery container (or jar), there has been used, for instance, ABS resin (acrylonitrile-butadiene-styrene copolymer). ABS resin has an excellent moldability and a good balance of rigidity, strength and dimensional accuracy, and because of these meritorious qualities, it has been preferentially used, with many satisfactory results, as battery container material. ABS resin, however, has the defect that its water vapor barrier properties are poor and it allows permeation of water vapor. This means that water in the electrolyte contained in a battery is vaporized in long-time use, is allowed to pass through the battery container, and disperse into the ambient atmosphere.

With the recent tendency toward higher temperature and lower humidity use conditions of the batteries and prolongation of battery life expectancy, the environment where the battery electrolyte tends to decrease is steadily increasing. Decrease of the battery electrolyte leads to a rise of internal resistance of the battery, thereby giving serious adverse effect to its discharge performance. Therefore, the use of a resin as much impervious to water vapor as possible is desired as battery container material.

Polyphenylene ether resin is popularly used as material of commercial products in many fields of industries, such as electronic parts, electric appliances, automobile parts, etc. because of its excellent mechanical strength, heat resistance and dimensional stability. Recently, its utilization as material of closed-type secondary battery container is studied for making use of its excellent water vapor barrier properties and acid resistance in addition to the above-mentioned properties.

A closed secondary battery usually comprises plural parts such as container body and cover, and these parts need to be bonded to each other with an adhesive or bonding agent to secure a hermetically closed condition in use of the battery. The bonding agent used for this purpose is required not only to meet such normal quality requirements as bonding strength and heat resistance but also to be resistant to the specific acid and alkali used for the electrolyte.

In the case of using such polyphenylene ether resin as battery container material, however, there arise problems because this resin is inferior to ABS resin in bonding strength, the bonded portions of the container could peel off when an internal pressure is exerted to the container during charging or discharging, or the container could be broken or cracked from its bonded section when, for instance, it is let to fall down.

As a result of the present inventors earnest studies, it has been found that when producing a closed secondary battery container, by bonding together the plural parts molded from a polyphenylene ether resin composition through a specific bonding agent, such a battery container is highly resistant to internal pressure and impact and capable of maintaining its normal performance constantly for a long time.

The present invention has been attained on the basis of the above finding.

SUMMARY OF THE INVENTION

An object of the present invention is to provide a closed secondary battery container which is highly resistant to internal pressure and impact, and capable of maintaining its high-level performance constantly for a long time.

Another object of the present invention is to provide a closed secondary battery comprising an electrolyte, electrodes and a closed secondary battery container which is resistant to internal pressure and impact and capable of maintaining its normal performance for a long time.

To accomplish the above aim, in a first aspect of the present invention, there is provided a closed secondary battery container comprising:

at least two parts made of a resin composition comprising (a) 100 parts by weight of a polyphenylene ether resin and (b) 1 to 30 parts by weight of a phosphoric ester compound represented by the following formula (1):

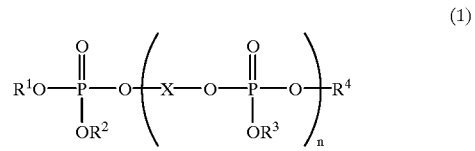

(1)

wherein $R^1$, $R^2$, $R^3$ and $R^4$ are independently a $C_1$–$C_{10}$ alkyl group, a $C_5$–$C_{15}$ cycloakyl group, a $C_6$–$C_{15}$ aryl group, a $C_1$–$C_{10}$ alkyl-substituted $C_6$–$C_{15}$ aryl group, a halogen-substituted $C_6$–$C_{15}$ aryl group, a $C_6$–$C_{15}$ aryl-substituted $C_1$–$C_{10}$ alkyl group, a halogen atom or a hydrogen atom; X is an arylene residue; and n is an integer not less than 1, and an epoxy resin adhesive comprising a base resin and a curing agent comprising tris(dimethylaminomethyl) phenol, a salt of organic acid of tris (dimethylaminomethyl)phenol or a mixture thereof, the said parts being bonded together through the said adhesive.

In a second aspect of the present invention, there is provided a closed secondary battery comprising the battery container as defined in the first aspect, an electrolyte and electrodes.

In a third aspect of the present invention, there is provided a method of forming a closed secondary battery container using the battery container parts and epoxy resin adhesive as defined in the first aspect.

DETAILED DESCRIPTION OF THE INVENTION

Figure 1:
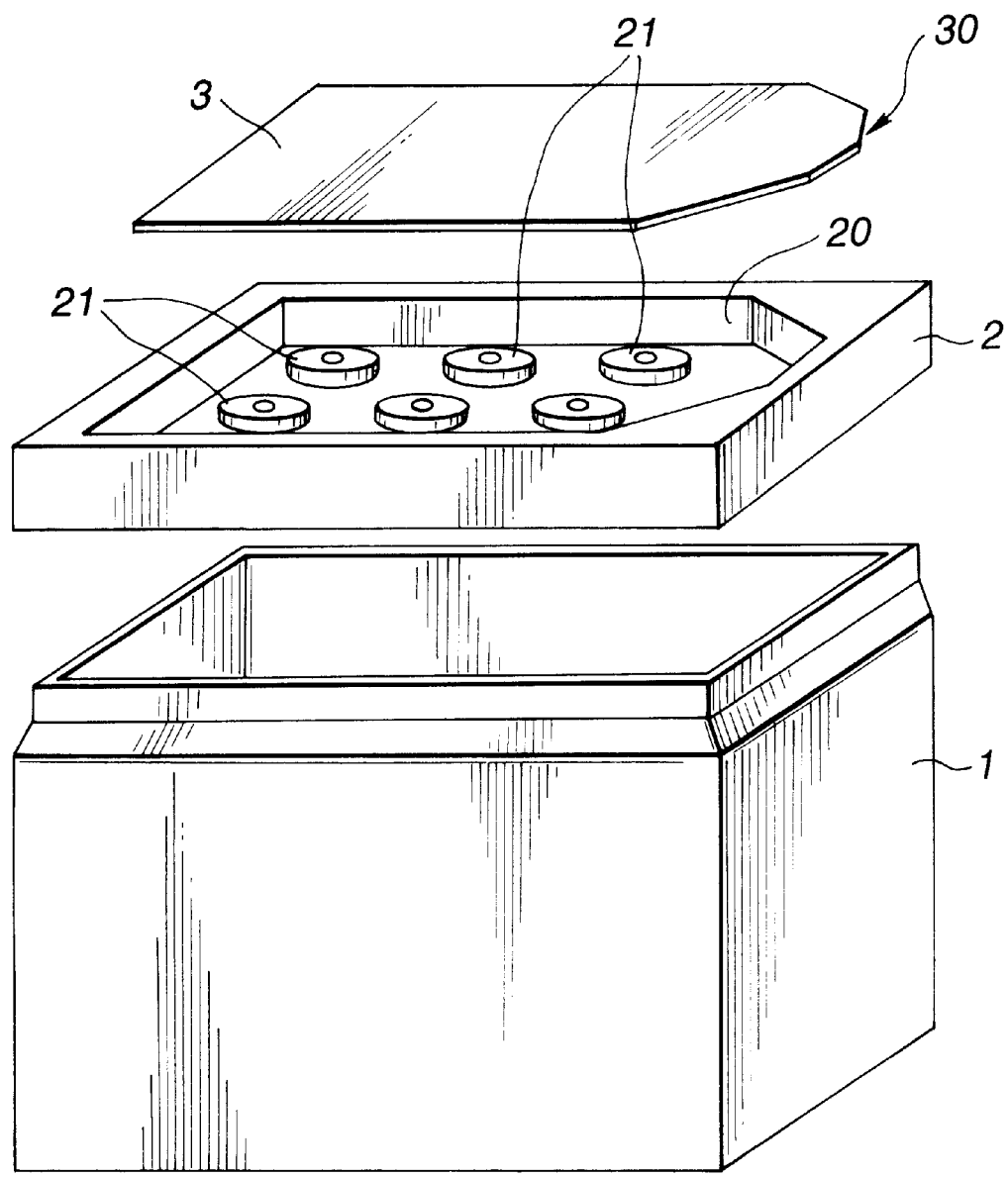
FIG. 1 is a perspective view of a primary part of the container, an inside cover and an outside cover used for the closed secondary battery according to the present invention.

The present invention will be described in further detail hereinbelow.

The parts constituting the closed secondary battery container of the present invention comprises a polyphenylene ether resin and a phosphoric ester compound.

As the polyphenylene ether resin (a) in the present invention, there can be used, for instance, polyphenylene ethers and mixtures thereof with styrene-based resins. The polyphenylene ethers preferably used in the present invention are a homopolymer or copolymer having a structure represented by the following formula (2):

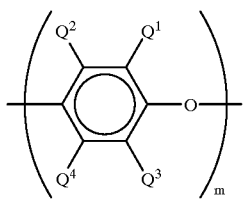
(2)

wherein each $Q^1$ is a halogen atom, a $C_1-C_{10}$ primary or secondary alkyl group, a $C_6-C_{15}$ aryl group, a $C_1-C_{10}$ aminoalkyl group, a $C_1-C_{10}$ hydrocarbon oxy group or a $C_1-C_{10}$ halohydrocarbon oxy group; each $Q^2$ is a hydrogen atom, a halogen atom, a $C_1-C_{10}$ primary or secondary alkyl group, a $C_6-C_{15}$ aryl group, a $C_1-C_{10}$ haloalkyl group, a $C_1-C_{10}$ hydrocarbon oxy group or a $C_1-C_{10}$ halohydrocarbon oxy group; and m is an integer not less than 10.

Preferred examples of the primary alkyl groups represented by $Q^1$ and $Q^2$ in the above formula are methyl, ethyl, n-propyl, n-butyl, n-amyl, isoamyl, 2-methylbutyl, n-hexyl, 2,3-dimethylbutyl, and 2-, 3- or 4-methylpentyl or -methylheptyl. Preferred examples of the secondary alkyl groups are isopropyl, sec-butyl and 1-ethylpropyl. In most cases, $Q^1$ is an alkyl or phenyl group, especially an alkyl group having 1 to 4 carbon atoms, and $Q^2$ is hydrogen atom.

The said polyphenylene ether homopolymers are preferably the polymers comprising 2,6-dimethyl-1,4-phenyleneether unit. The polyphenylene ether copolymers are preferably the random copolymers comprising a combination of the above mentioned units and 2,3,6-trimethyl-1,4-phenylene ether unit. Many preferable homopolymers and random copolymers for use in the present invention are described in the prior patents and literature. Use of a polyphenylene ether having a molecular component functioning to improve such properties as molecular weight, melt viscosity and/or impact strength is also preferable for use in the present invention.

Intrinsic viscosity of the polyphenylene ether used in the present invention is preferably in the range from 0.2 to 0.8 dl/g as measured in chloroform at 30° C. When the intrinsic viscosity of the polyphenylene ether used is less than 0.2 dl/g, the produced composition may be low in impact strength, and when the intrinsic viscosity exceeds 0.8 dl/g, the obtained composition may be unsatisfactory in moldability. The more preferred range of intrinsic viscosity is from 0.2 to 0.7 dl/g, even more preferably from 0.25 to 0.6 dl/g.

The styrene-based resins used in the present invention may include the polymers comprising the repeating units of an aromatic vinyl compound represented by the following formula (3):

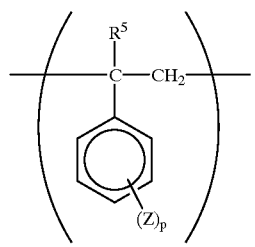
(3)

(wherein $R^5$ is a hydrogen atom or a $C_1-C_4$ alkyl group; Z is a hydrogen atom, a $C_1-C_4$ alkyl group or a halogen atom; and p is an integer of 1 to 5), and copolymers thereof with other copolymerizable monomers having the said repeating units in an amount not less than 50% by weight.

The said styrene-based resins include the polymers of styrene, α-alkyl-substituted styrene, nuclear alkyl-substituted styrene and mixtures thereof, and styrene polymers modified with a rubber such as polybutadiene, styrene-butadiene copolymer, polyisoprene, ethylene-propylene copolymer, etc. of these styrene-based resins, polystyrene, rubber-modified polystyrene and a mixture thereof are preferred.

In the present invention, the mixing ratio (by weight) of polyphenylene ether/styrene resin is in the range from 95/5 to 5/95. When the ratio of the styrene-based resin is less than 5% by weight, the produced composition may be unsatisfactory in moldability, and when the ratio exceeds 95% by weight, the produced composition may be low in heat resistance. The mixing ratio (by weight) of polyphenylene ether/styrene resin is preferably in the range from 90/10 to 10/90, more preferably from 85/15 to 15/85.

The phosphoric ester compound (b) used in the present invention is represented by the following formula (1):

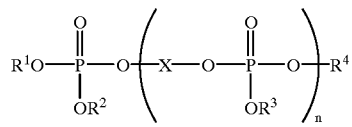
(1)

wherein $R^1$, $R^2$, $R^3$ and $R^4$ are independently a $C_1-C_{10}$ alkyl group, a $C_5-C_{15}$ cycloalkyl group, a $C_6-C_{15}$ aryl group, an $C_1-C_{10}$ alkyl-substituted $C_6-C_{15}$ aryl group, a halogen-substituted $C_6-C_{15}$ aryl group, a $C_6-C_{15}$ aryl-substituted $C_1-C_{10}$ alkyl group, a halogen atom or a hydrogen atom, but preferably at least one of $R^1$, $R^2$, $R^3$ and $R^4$ is a $C_6-C_{15}$ aryl group or $C_1-C_{10}$alkyl-substituted $C_6-C_{15}$ aryl group, more preferably all of $R^1$, $R^2$, $R^3$ and $R^4$ are $C_1-C_{10}$ aryl groups or $C_1-C_{10}$ alkyl-substituted $C_6-C_{15}$ aryl group, the preferred examples of such aryl groups being phenyl, xylenyl, cresyl and their halogenated derivatives; X is an arylene residue such as residue of resorcinol, hydroquinone, bisphenol A, biphenol and their halogenated derivatives; and n is an integer not less than 1, preferably 1 to 5. In case where the phosphoric ester compounds represented by the above formula (1) are the condensates, many of the said ester compounds are a blend of the compounds having the different values of n, wherein the average value of n is preferably 1 to 5.

The phosphorus content in the phosphoric ester compounds (b) represented by the formula (1) is preferably not less than 3%, more preferably not less than 5%. When the phosphorus content is less than 3%, the flame retarding effect may be unsatisfactory.

The content of the phosphoric ester compound (b) represented by the formula (1) in the resin composition of the present invention is 1 to 30 parts by weight based on 100 parts by weight of the polyphenylene ether resin. When the content of the phosphoric ester compound (b) represented by the formula (1) may be less than 1 part by weight, flame retardancy of the composition may be unsatisfactory, and when the said content exceeds 30 parts by weight, the composition may be low in heat resistance. The content of the phosphoric ester compound (b) represented by the formula (1) in the resin composition is preferably in the range from 3 to 27 parts by weight, more preferably from 5 to 25 parts by weight based on 100 parts by weight of the polyphenylene ether resin.

In the present invention, it is preferred to add a thermoplastic elastomer to the resin composition for improving impact strength. As such a thermoplastic elastomer, there can be used, for example, butadiene rubber, isoprene rubber, styrene-conjugated diene block copolymer, hydrogenated products thereof, ethylene-α-olefin copolymer rubber, nylon elastomer, polyester elastomer, urethane elastomer, silicon elastomer, fluorine elastomer and the like. The amount of the thermoplastic elastomer added is preferably in the range from 0 to 30 parts by weight, more preferably from 1 to 30 parts by weight based on 100 parts by weight of the polyphenylene ether resin.

Other substances can be added, if necessary, to the resin composition of the present invention. For instance, it is possible to add known antioxidant, weathering resistance improver, nucleating agent, impact resistance improver, plasticizer, flowability improver and the like, which are commonly used as additives for thermoplastic resins. Addition of an organic filler, reinforcing agent and inorganic filler, such as glass fiber, talc, mica, calcium carbonate, silica, clay, etc., contributes to the improvement of rigidity, heat resistance and dimensional properties of the composition and its molded products. Various types of colorant and their dispersing agents may be further added for practical use of the composition.

In the resin composition of the present invention, it is also possible to add other thermoplastic resins such as polyolefins, polyamides, polyesters, polyallylene sulfide, etc., within limits not prejudicial to the effect of the present invention. The content of other thermoplastic resin(s) than the polyphenylene ether resin and styrene resin is preferably within the range from 0 to 30 parts by weight based on 100 parts by weight of the polyphenylene ether resin.

For obtaining the resin composition of the present invention, there can be used, for instance, a method in which the starting materials are mixed by a known mixing machine such as single- or multiple-screw kneader, Banbury mixer, rolls, Brabender Plastograph or the like, and the mixture is quenched and solidified; or a solution mixing method in which the materials are added to a hydrocarbon such as hexane, heptane, benzene, toluene, xylene or the like or a derivative thereof, and the dissolved materials are mixed with each other, or the dissolved and undissolved materials are mixed in a suspended state. Melt kneading by use of the above mixing machine is preferred in terms of industrial cost.

The closed secondary battery container of the present invention comprises at least two parts which are bonded together with an epoxy adhesive. For producing the closed secondary batter container of the present invention, at least two parts are molded by using the resin composition of the present invention. These two or more container parts may be molded simultaneously, but usually they are molded separately from each other. The molding method is not specifically defined; it is possible to employ any preferable method generally used for the resin compositions, such as injection molding, hollow molding, extrusion molding, sheet forming, hot molding, rotational molding, and laminate molding.

In the present invention, the battery container parts comprising a resin composition comprising a polyphenylene ether resin (a) and a phosphoric ester compound (b), are bonded together with a specific epoxy resin adhesive which is described in detail below. The battery container made by combination of the said resin composition and an epoxy resin adhesive, also described below, is appreciably improved in endurance against internal pressure and impact resistance.

The epoxy resin adhesive used in the present invention is an adhesive made of a resin having an epoxy skeletal structure, and it is a two-part adhesive comprising a base resin and a curing agent. The base resin/curing agent two-part mixed adhesive has high adhesive strength, heat resistance, chemical resistance, acid resistance and alkali resistance. The epoxy resin used as base of the two-part system is liquid at normal temperature or a solid with a low melting point, and in use, it is blended with a curing agent and cured on application to an object.

The base resins usable in the present invention include novolak epoxy resins such as phenol-formaldehyde resin and cresol-formaldehyde resin, epoxy resins produced from polyhydroxy compounds such as bisphenol, resorcinol, etc., and epichlorohydrin, diglycidyl esters such as dimer acids, and the like. These base resins may be used either singly or as a mixture of two or more of them. A reactive diluent may be added, if necessary.

The curing agent used in the present invention is tris (dimethylaminomethyl)phenol and/or an organic acid salt of tris(dimethylaminomethyl)phenol, preferably a mixture of tris(dimethylaminoethyl)phenol and its organic acid salt. As the organic acid salt of tris(dimethylaminomethyl)phenol, there is used preferably a trialkyl carboxylate, more preferably a tridiethyl hexoate represented by the following formula:

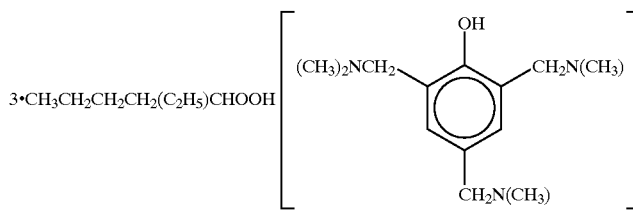

The mixing ratio (by weight) of tris (dimethylaminomethyl)phenol/organic acid salt is preferably in the range from 10/1 to 1/10, more preferably from 7/1 to 1/7, even more preferably from 5/1 to 1/7. The mixing ratio (by weight) of base resin/curing agent is preferably in the range from 100/1 to 100/50, more preferably from 100/3 to 100/30, even more preferably from 100/5 to 100/25. In conducting bonding in the present invention, it is preferable to conduct heating on the epoxy resin for curing it. The heating temperature is preferably not lower than 40° C., more preferably not lower than 50° C., even more preferably not lower than 60° C.

The epoxy adhesives usable in the present invention include those commercially available under the trade names of "Cemedine" from Cemedine Kogyo Co., Ltd., "Araldite" from Japan Ciba Giegy Corp., "Bond" from Konishi Ltd., and "Epikote" from Yuka Shell Epoxy Co., Ltd. As the curing agent, there can be used, for instance, those commercially available under the trade names of "Epicure" from Yuka Shell Epoxy Co., Ltd., and "Daitokural" from Daito Sangyo Co., Ltd.

As described above, the closed secondary battery container of the present invention comprises at least two parts molded from a polyphenylene ether resin composition containing a specific phosphoric ester compound, the said parts being bonded together with an epoxy resin incorporated with a specific curing agent to provide strong bond between the parts.

In the present invention, a closed secondary battery comprises the battery container defined in the first aspect, electrolyte and electrodes.

The closed secondary battery is defined as a closed battery capable of charging and discharging and is represented by a lead storage battery, a nickel-cadmium battery, a nickel-hydrogen battery, lithium battery, or the like. In the closed secondary battery, generally, metal electrodes and electrolyte are packed closely in the battery container. For example, in case of lead storage battery, lead electrodes and sulfuric acid are packed closely in a battery container, and in case of nickel battery, nickel electrodes and aqueous alkaline solution such as aqueous sodium hydroxide are packed closely in a battery container. The closed secondary battery according to the present invention is usually produced by a manner comprising setting the electrodes, electrolyte and other necessary parts in the battery container comprising plural parts as described in the above, and bonding the parts with the adhesive as described in the above to obtain the closed secondary battery.

The typical method of producing closed secondary battery according to the present invention is explained by use of FIG. 1 which is an example of the perspective view of the parts constituting the closed secondary battery according to the present invention.

In FIG. 1, the reference numeral 1 denotes a primary part of the container, the reference numeral 2 denotes an inside cover with plural holes 21 for setting an electrode and with a hollow part 20, and the reference numeral 3 denotes an outside cover with a notched part 30 passed through wires connecting the electrodes to an external load.

First, positive electrode(s), separator(s) and negative electrode(s) (not shown) are set in the inside cover 2 and the primary part of the container 1. An electrolysis solution is poured into the primary part of the container 1. The inside cover 2 is bonded to the primary part of the container 1 with the epoxy resin adhesive described in the above. The wires to connect the electrodes to an external load are set and the hollow part 20 are filled with the said epoxy resin adhesive.

And then, the outside cover 3 is fitted to the hollow part and bonded to inside cover 2 while the wires are passed through the notched part 30, to produce the closed secondary battery.

The closed secondary battery container of the present invention is not only excellent in mechanical strength such as rigidity and impact strength, heat resistance and water vapor barrier properties but also has high bond strength between the component parts by use of an epoxy resin, so that the closed secondary batter, using the container of the present invention has a structure proof against internal pressure and impact forces and can maintain its normal performance for a long time.

EXAMPLES

The present invention will hereinafter be described in further detail with reference to the examples thereof, but it is to be understood that these examples are merely intended to be illustrative and not to be construed as limiting the scope of the invention in any way.

The materials specified below were used as resin components in the following Examples.
(1) Polyphenylene ether: poly(2,6-dimethyl-1,4-phenylene ether) produced by Mitsubishi Gas Chemical Co., Ltd.; intrinsic viscosity measured in 30° C. chloroform=0.46 dl/g; hereinafter referred to as PPE.
(2) Polystyrene: Diarex HT-478, a rubber- reinforced polystyrene produced by Mitsubishi Chemical Corporation hereinafter referred to as PS.
(3) Resorcinol polyphenyl phosphate (hereinafter referred to as phosphoric ester compound 1)
(4) Bisphenol A polycresyl phosphate (hereinafter referred to as phosphoric ester compound 2)
(5) Triphenyl phosphate (hereinafter referred to as phosphoric ester compound 3)
(6) Flame retardant ABS resin: Toughrex TFX-SI produced by Mitsubishi Chemical Corporation (hereinafter referred to as ABS resin)
(7) Base of epoxy resin: Epikote 828 produced by Yuka Shell Epoxy Co., Ltd.
(8) Curing agent 1 of epoxy resin: a 50/50 (wt %) mixture of 2,4,6-tris(dimethylaminomethyl)phenol and tridiethylhexoate of 2,4,6-tris(dimethylaminomethyl)phenol (hereinafter referred to as curing agent 1). The weight ratio of base/curing agent at the time of use was adjusted to be 100/15.
(9) Curing agent 2 of epoxy resin: prepared by mixing 40 wt % of benzyl alcohol as diluent in diaminodiphenylmethane (hereinafter referred to as curing agent 2). The weight ratio of base/curing agent at the time of use was adjusted to be 100/50.

Determination and evaluation of the properties were made according to the following methods.
(10) Izod impact test:
Notched Izod impact test was conducted according to ASTM D-256. In the present invention, the products preferably have an impact strength of not lower than 100 J/m.
(11) Bending modulus:
Three-point bending test was conducted by the bend testing method according to ASTM D-790. In the present invention, the products preferably have a bending modulus of not less than 2000 MPa.
(12) Thermal deformation temperature:
Deformation-under-load test was conducted under a load of 18.6 kg/cm$^2$ according to ASTM D-648. In the present invention, the products preferably have a thermal deformation temperature of not less than 80° C.

(13) Moisture permeability:

A 1 mm thick sheet was injection molded at cylinder temperature of 240° C. and mold temperature of 60° C., and its moisture permeability was evaluated under the conditions of 40° C. and 90% RH according to JIS K-7129B. In the present invention, the products preferably have a moisture permeability of not more than 4.0 g/m²·day.

(14) Bond strength:

A dumbbell specimen for ASTM tensile test was cut along its center line into two pieces, and after degreasing the areas to be bonded with ethanol, the previously prepared epoxy adhesive was applied uniformly on the linear sections of the two pieces and they were bonded overlapping each other with an overlap length of 20 mm. Then the bonded portion was fixed with a clip, cured in an oven at 80° C. for one hour and subjected to a tensile test with a tensile tester by pulling the specimen at a testing rate of 5 mm/min. The calculated breaking load was divided by the mileage (bonded area) to determine the shear strength, and the divided value was expressed as bond strength. In the present invention, the products preferably have a bond strength of not less than 25 kg/cm².

Examples 1 to 4

The materials shown in Table 1 were mixed and melt kneaded in the blending ratios also shown in Table 1 by a twin-screw extruder (mfd. by Japan Steel Works, Ltd.) at a cylinder temperature of 210° C. and a screw revolution speed of 250 rpm to obtain the resin compositions. These resin compositions were injection molded under the conditions of cylinder temperature=240° C. and mold temperature=60° C. to make the molded articles and their properties were evaluated in the manner described above. The results are shown in Table 1.

TABLE 1

|  | Example 1 | Example 2 | Example 3 | Example 4 |
| --- | --- | --- | --- | --- |
| PPE (parts by weight) | 52 | 52 | 62 | 62 |
| PS (parts by weight) | 48 | 48 | 38 | 38 |
| Phosphoric ester compound 1 (parts by weight) | 15 | — | 11 | — |
| Phosphoric ester compound 2 (parts by weight) | — | 17 | — | 13 |
| Base/curing agent (parts by weight) | 100/15 | 100/15 | 100/15 | 100/15 |
| Type of curing agent | Curing agent 1 | Curing agent 1 | Curing agent 1 | Curing agent 1 |
| Izod impact strength (J/m) | 240 | 180 | 250 | 190 |
| Bending modulus (MPa) | 2,400 | 2,600 | 2,400 | 2,600 |
| Thermal deformation temperature (° C.) | 90 | 90 | 105 | 105 |
| Permeability (g/m²·day) | 2.9 | 2.8 | 2.8 | 2.7 |
| Flame retardancy | V-0 | V-0 | V-0 | V-0 |
| Bond strength (kg/cm²) | 33 | 35 | 34 | 36 |

Comparative Examples 1 to 3

The materials shown in Table 2 were mixed and melt kneaded in the blending ratios also shown in Table 2 by a double-screw extruder (mfd. by Japan Steel Works, Ltd.) at a cylinder temperature of 210° C. and a screw revolution speed of 250 rpm to obtain the resin compositions. These resin compositions were injection molded under the conditions of cylinder temperature=240° C. and mold temperature=60° C. to make the molded articles and their properties were evaluated in the manner described above. The results are shown in Table 2.

Comparative Example 4

A flame-retardant ABS resin was injection molded under the conditions of cylinder temperature=220° C. and mold temperature=60° C. to make the molded articles and their properties were evaluated in the manner described above. The results are shown in Table 2.

TABLE 2

|  | Comp. Example 1 | Comp. Example 2 | Comp. Example 3 | Comp. Example 4 |
| --- | --- | --- | --- | --- |
| PPE (parts by weight) | 52 | 52 | 62 | ABS |
| PS (parts by weight) | 48 | 48 | 48 | — |
| Phosphoric ester compound 1 (parts by weight) | — | 15 | — | — |
| Phosphoric ester compound 2 (parts by weight) | — | — | 17 | — |
| Phosphoric ester compound 3 (parts by weight) | 14 | — | — | — |
| Base/curing agent (parts by weight) | 100/15 | 100/50 | 100/50 | 100/15 |
| Type of curing agent | Curing agent 1 | Curing agent 2 | Curing agent 2 | Curing agent 1 |
| Izod impact strength (J/m) | 240 | 240 | 180 | 120 |
| Bending modulus (MPa) | 2,400 | 2,400 | 2,600 | 2,500 |
| Thermal deformation temperature (° C.) | 90 | 90 | 90 | 76 |
| Permeability (g/m²·day) | 2.9 | 2.9 | 2.8 | 5.9 |
| Flame retardancy | V-0 | V-0 | V-0 | V-0 |
| Bond strength (kg/cm²) | 23 | 20 | 19 | 34 |

What is claimed is:

1. A closed secondary battery container comprising:

at least two container parts comprising a resin composition comprising (a) 100 parts by weight of a polyphenylene ether resin and (b) 1 to 30 parts by weight of a phosphoric ester compound represented by the following formula (1):

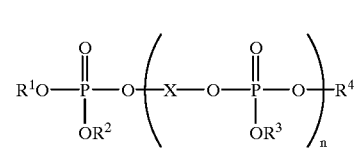

(1)

wherein $R^1$, $R^2$, $R^3$ and $R^4$ are independently any of $C_1$–$C_{10}$ alkyl group, a $C_5$–$C_{15}$ cycloakyl group, a $C_6$–$C_{15}$ aryl group, a $C_1$–$C_{10}$ alkyl-substituted $C_6$–$C_{15}$ aryl group, a halogen-substituted $C_6$–$C_{15}$ aryl group, a $C_6$–$C_{15}$ aryl-substituted $C_1$–$C_{10}$ alkyl group, a halogen atom or a hydrogen atom; X is an arylene group; and n is an integer not less than 1, and an epoxy resin adhesive comprising a base resin and a curing agent, which curing agent comprises tris(dimethylaminomethyl)phenol, a salt of organic acid of tris(dimethylaminomethyl)phenol or a mixture thereof, said parts being bonded together through said adhesive.

2. A closed secondary battery container according to claim 1, wherein the polyphenylene ether is a homopolymer or a copolymer having a structure represented by the following formula (2):

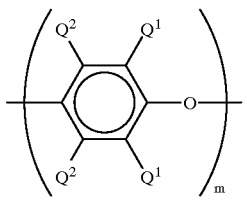

(2)

where each $Q^1$ is a halogen atom, a primary or secondary $C_1$–$C_{10}$ alkyl group, a $C_6$–$C_{15}$ aryl group, a $C_1$–$C_{10}$ aminoalkyl group, a $C_1$–$C_{10}$ hydrocarbon oxy group or a $C_1$–$C_{10}$ halohydrocarbon oxy group; each $Q^2$ is a hydrogen atom, a halogen atom, a primary or secondary $C_1$–$C_{10}$ alkyl group, a $C_6$–$C_{15}$ aryl group, a $C_1$–$C_{10}$ haloalkyl group, a $C_1$–$C_{10}$ hydrocarbon oxy group or a $C_1$–$C_{10}$ halohydrocarbon oxy group; and m is an integer not less than 10.

3. A closed secondary battery container according to claim 1, wherein the mixture of polyphenylene ether resin comprises a polyphenylene ether and a styrene-based resin, with the weight ratio of polyphenylene ether/styrene resin being in the range from 90/10 to 10/90.

4. A closed secondary battery container according to claim 3, wherein the styrene-based resin is a copolymer comprising a polymer comprising the repeating units of an aromatic vinyl compound represented by the following formula (3):

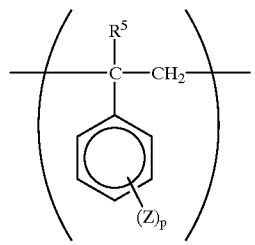

(3)

where $R^5$ is a hydrogen atom or a $C_1$–$C_4$ alkyl group; Z is a hydrogen atom, a $C_1$–$C_4$ alkyl group or a halogen atom; and p is an integer of 1 to 5, and other copolymerizable monomer containing not less than 50% by weight of said repeating units.

5. A closed secondary battery container according to claim 1, wherein the curing agent is a mixture of tris (dimethylaminomethyl)phenol and an organic acid salt of tris(dimethylaminomethyl)phenol.

6. A closed secondary battery container according to claim 1, wherein the organic acid salt of tris (dimethylaminomethyl)phenol is a trialkyl carboxylate of tris(dimethylaminomethyl)phenol.

7. A closed secondary battery comprising the battery container defined in claim 1, an electrolyte and electrodes.

8. A method for producing a closed secondary battery container comprising bonding said at least two container parts of claim 1 with the epoxy resin adhesive of claim 1.

9. A closed secondary battery container according to claim 1, wherein X is a member selected from the group consisting of a resorcinol group, a hydroquinone group, a bisphenol A group, a bisphenol group, and their halogenated derivatives.

* * * * *